United States Patent
Qiao et al.

(10) Patent No.: US 10,668,461 B2
(45) Date of Patent: Jun. 2, 2020

(54) STEPWISE SOLIDUS SYNTHESIS METHOD FOR A MICRO-MESOPOROUS CALCIUM ALUMINATE CATALYST

(71) Applicant: China University of Petroleum (East China), Qingdao (CN)

(72) Inventors: Yingyun Qiao, Qingdao (CN); Yuanyu Tian, Qingdao (CN); Jinhong Zhang, Qingdao (CN); Ruiyuan Tang, Qingdao (CN); Yuanjun Che, Qingdao (CN); Jun Li, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/555,142

(22) Filed: Aug. 29, 2019

(65) Prior Publication Data

US 2020/0139359 A1     May 7, 2020

(30) Foreign Application Priority Data

Nov. 2, 2018 (CN) .......................... 2018 1 1300869

(51) Int. Cl.
*B01J 37/10* (2006.01)
*B01J 23/02* (2006.01)
*B01J 37/00* (2006.01)

(52) U.S. Cl.
CPC ............ *B01J 37/105* (2013.01); *B01J 23/02* (2013.01); *B01J 37/0018* (2013.01); *B01J 37/0063* (2013.01)

(58) Field of Classification Search
CPC ...... B01J 37/105; B01J 23/02; B01J 37/0018; B01J 37/0063
See application file for complete search history.

(56) References Cited

U.S. PATENT DOCUMENTS 3,969,542 A * 7/1976 Tomita ................. B01J 23/02
                                                    502/250
2015/0299040 A1* 10/2015 Nelson ................ C04B 7/345
                                                    106/771

FOREIGN PATENT DOCUMENTS

EP      1641562 B1 * 12/2018 ......... B01D 53/8628

OTHER PUBLICATIONS

Singh, Vipin Kant, and Krishna Kumar Sharma. "Low-Temperature Synthesis of Calcium Hexa-Alunninate." Journal of the American Ceramic Society 85.4 (2002): 769-772 (Year: 2002).*
Manias, Con G. "Kiln burning systems." Innovations in Portland cement manufacturing, SP400. Portland Cement Association (PCA), Skokie (2004) (Year: 2004).*

* cited by examiner

*Primary Examiner* — Anthony J Zimmer
*Assistant Examiner* — Ricardo D Morales
(74) *Attorney, Agent, or Firm* — Volpe and Koenig, P.C.

(57) ABSTRACT

The present disclosure relates to the technical field of fine chemical engineering, and particularly discloses a stepwise solidus synthesis method for a micro-mesoporous calcium aluminate catalyst, comprising: mixing a calcium oxide-based powder with an alumina-based powder and an adhesion pore-enlarging agent; pelleting and molding the mixture; pyrolyzing and coking the pelleted and molded product in a rotary kiln reactor under the conditions including an outlet reaction temperature of 300° C.~500° C. and a residence time of 0.2~3.5 h; and subsequently carrying out a solidus reaction in an internal heating rotary kiln reactor under the conditions including an outlet reaction temperature of 900° C.~1,500° C. and a residence time of 0.1~5 h to produce calcium aluminate; decomposing and gasifying the pyrolyzed char in the calcium aluminate to promote the formation of pores, thereby producing micro-mesoporous calcium aluminate catalyst; wherein the weight ratio between the calcium oxide-based powder and the alumina-based powder is within a range of 12:(2~15), the added amount of the adhesion pore-enlarging agent accounts for 0.1~15% by weight of a total amount of the calcium oxide-based powder and alumina-based powder; wherein the weight of the calcium oxide-based powder is calculated based on calcium oxide, and the weight of the alumina-based powder is calculated based on alumina. The calcium aluminate catalyst prepared with the method provided by the present disclosure has advantages of large specific surface area, low density and high strength.

15 Claims, No Drawings

STEPWISE SOLIDUS SYNTHESIS METHOD FOR A MICRO-MESOPOROUS CALCIUM ALUMINATE CATALYST

CROSS REFERENCE TO RELATED APPLICATIONS

The application claims priority to Chinese Application No. 201811300869.2, filed on Nov. 2, 2018, entitled "Stepwise Solidus Synthesis Method for a Micro-mesoporous Calcium Aluminate Catalyst", which is specifically and entirely incorporated herein by reference.

FIELD

The present disclosure relates to the technical field of fine chemical engineering, and particularly relates to a stepwise solidus synthesis method for a micro-mesoporous calcium aluminate catalyst.

BACKGROUND

The inferior heavy oil is rich in polycyclic aromatic hydrocarbons, it has high carbon hydrogen ratio, viscosity and density as well as excessively high content of sulfur, nitrogen, oxygen, residual carbon, heavy metals and mechanical impurities, and exhibits the resource characteristics such as being prone to condense and chars formation, which presents a significant challenge to the conventional processing routes of heavy oil. Most of the existing heavy oil processing technologies are difficult to meet the requirements of efficient and clean "chemical type" processing. The delayed coking is currently the preferred technology for disposing the inferior heavy oil, but it confronts with many challenges such as high output of inferior high-sulfur char, low yield of coking wax oil, difficulties in carrying out the "chemical type" processing, environmental pressure resulting from emission of large amount of volatiles, and potential safety hazard of shot chars. The catalytic cracking and hydrocracking technology for processing inferior heavy oil suffers many difficult problems such as low conversion rate, poor selectivity and low yield of olefin product, rapid deactivation and excessive consumption of catalyst, poor stability of the cracking device and excessively high processing costs; the solvent deasphalting technology used for processing inferior heavy oil faces with many problems, for instance, low yield of deasphalted oil, complicated "chemical type" processing, the highly efficient utilization of large-scale hard asphalt becomes the bottleneck of its industrialization. The technology of hydrogenation in suspended bed for the processing of heavy oil can theoretically meet the requirements of efficient and clean pretreatment of inferior heavy oil, But it has the characteristics of low conversion rate, high hydrogen consumption, low removal rate of heavy metals, the problems concerning tail oil processing and low-cost hydrogen source demand a prompt solution, and there are still some defects in the processing technology and equipment matching, thus it has not been put into large-scale industrial application successfully; in addition, the hydrogenated wax oil needs the secondary processing to achieve the "chemical type" processing, and the reciprocating cycle of hydrogenation and dehydrogenation during the process results in an excessively high energy consumption and poor economic performance.

Although many new technologies for the production of a variety of low-carbon olefins by catalytic cracking of heavy oil have been developed in China and foreign countries in recent years, for example, the DCC/CPP process developed by the SINOPEC Research Institute of Petroleum Processing (RIPP), the PetroFCC process developed by the Universal Oil Products (UOP) Company in the United States of America (USA), the HS-FCC process and THR process developed by the Japan Petroleum Energy Center, the TCSC process developed by the German Institute of Organic Chemistry, the INDMAX (UCC) process developed by the Indian Oil Corporation, the Maxofin process jointly developed by the Exxon Mobil and the Kellog Corporation, and the two-stage riser catalytic cracking (TMP) process proposed by China University of Petroleum (CUP), the new technologies have attracted extensive attention and pilot applications as demonstration projects in the petrochemical industry. However, due to the adaption and matching requirements between the structural properties of acidic molecular sieve catalysts and the heavy oil macromolecules, the current catalytic cracking of the inferior raw materials such as atmospheric residue oil, vacuum residue oil and deasphalted oil for preparing olefins suffers from a small pore structure of the catalyst, the diffusion of large heavy oil molecules in the process of mass transfer is subject to restriction, the molecules are difficult to enter the interior of the molecular sieve for performing the shape selective cracking. In addition, the strong hydrogen transfer performance of the acidic molecular sieve results in that the improvement scopes of the yield and selectivity of the olefins are limited; the molecules aggregated on the surface of the molecular sieve are prone to be excessively cracked under the action of the acidic center, it causes the poor product distribution or the occurrence of coking and condensation, thereby blocking pore channels of the catalyst. The currently used industrial and shape selective catalysts facilitates catalytic cracking of the inferior raw materials such as atmospheric residue oil, vacuum residue oil, deasphalted oil for preparing the low-carbon olefins. However, the cracking process suffers many problems, such as catalyst poisoning, poor atomization effect, large production of petroleum char, significantly reduced conversion rate and selectivity, thus the further development and optimization are urgently needed.

The calcium aluminate catalyst is an alkaline inorganic compound synthesized from the calcium oxide-based and alumina-based powder materials; the catalyst has strong alkalinity, high hardness, high melting point and desirable abrasive resistance, and may resist high temperature, water vapor and heavy metal pollution; the catalyst lacks the hydrogen transfer effect and can greatly improve the selectivity of pyrolyzed olefins; the strong dehydrogenation performance enables the hydrogen radicals to inhibit polycondensation of the pyrolyzed aromatic hydrocarbon radicals in the heavy oil, reduce char formation, thereby significantly improve the yield of liquid cracked from the heavy oil; in addition, it can promote the coking combustion or gasification regeneration reaction of the spent catalyst to be regenerated, and lower the regeneration temperature, thus it is a catalyst for cracking and chemical processing of heavy oil with great application potential. However, the calcium aluminate catalyst at present is mainly synthesized by high-temperature solidus reaction, the catalyst lacks a pore structure, and it has small surface area and large specific gravity, thus it is difficult to maximize the advantages that the alkaline catalyst may inhibit char formation and enhance selectivity of olefins, the lack of pore structure has become a bottleneck of an industrial application of the calcium aluminate catalyst.

SUMMARY

The objective of the present disclosure is to provide a stepwise solidus synthesis method for a micro-mesoporous calcium aluminate catalyst in order to overcome the deficiencies in the process of preparing the calcium aluminate catalyst in the prior art, the micro-mesoporous calcium aluminate catalyst having large specific surface area, low density and high strength is prepared by adopting measures, such as mixing a calcium oxide-based powder with an alumina-based powder and an adhesion pore-enlarging agent which is prone to form char, pelleting, coking with low temperature, performing the high-temperature solidus synthesis, decomposing and gasifying the pyrolyzed char in the calcium aluminate to promote the formation of pores.

The present disclosure provides a stepwise solidus synthesis method for a micro-mesoporous calcium aluminate catalyst, comprising: mixing a calcium oxide-based powder with an alumina-based powder and an adhesion pore-enlarging agent; pelleting and molding the mixture; pyrolyzing and coking the pelleted and molded product in a rotary kiln reactor under the conditions including an outlet reaction temperature of 300° C.~500° C. and a residence time of 0.2~3.5 h; and subsequently carrying out a solidus reaction in an internal heating rotary kiln reactor under the conditions including an outlet reaction temperature of 900° C.~1,500° C. and a residence time of 0.1~5 h to produce calcium aluminate; decomposing and gasifying the pyrolyzed char in the calcium aluminate to promote the formation of pores, thereby producing micro-mesoporous calcium aluminate catalyst; wherein the weight ratio between the calcium oxide-based powder and the alumina-based powder is within a range of 12:(2~15), the added amount of the adhesion pore-enlarging agent accounts for 0.1~15% by weight of a total amount of the calcium oxide-based powder and alumina-based powder; wherein the weight of the calcium oxide-based powder is calculated based on calcium oxide, and the weight of the alumina-based powder is calculated based on alumina.

The stepwise solidus synthesis method for a micro-mesoporous calcium aluminate catalyst provided by the present disclosure may be used for preparing the calcium aluminate catalyst with large specific surface area, low density and high strength. The catalyst has an abrasion resistance index less than 0.3% and a heat resistance temperature up to 850° C.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a stepwise solidus synthesis method for a micro-mesoporous calcium aluminate catalyst, comprising: mixing a calcium oxide-based powder with an alumina-based powder and an adhesion pore-enlarging agent; pelleting and molding the mixture; pyrolyzing and coking the pelleted and molded product in a rotary kiln reactor under the conditions including an outlet reaction temperature of 300° C.~500° C. and a residence time of 0.2~3.5 h; and subsequently carrying out a solidus reaction in an internal heating rotary kiln reactor under the conditions including an outlet reaction temperature of 900° C.~1,500° C. and a residence time of 0.1~5 h to produce calcium aluminate; decomposing and gasifying the pyrolyzed char in the calcium aluminate to promote the formation of pores, thereby producing micro-mesoporous calcium aluminate catalyst; wherein the weight ratio between the calcium oxide-based powder and the alumina-based powder is within a range of 12:(2~15), the added amount of the adhesion pore-enlarging agent accounts for 0.1~15% by weight of a total amount of the calcium oxide-based powder and alumina-based powder; wherein the weight of the calcium oxide-based powder is calculated based on calcium oxide, and the weight of the alumina-based powder is calculated based on alumina.

Unless otherwise specifically defined in the present disclosure, the weight of the calcium oxide-based powder is calculated based on calcium oxide, and the weight of the alumina-based powder is calculated based on alumina.

The present disclosure defines a wide range of choices concerning the specific type of the calcium oxide-based powder, it may be a variety of calcium oxide-based powder conventionally used in the technical field. Unless otherwise specifically defined, the term "calcium oxide-based powder" in the present disclosure refers to a substance which can be converted into calcium oxide by the synthesis method of the present disclosure. Preferably, the calcium oxide-based powder is at least one selected from the group consisting of nanometer calcium carbonate powder, calcium hydroxide powder, calcium oxide powder, calcium acetate powder, calcium nitrate powder and limestone powder, and more preferably the calcium oxide-based powder is nanometer calcium carbonate powder and/or limestone powder. The nanometer calcium carbonate powder of the present disclosure refers to ultrafine calcium carbonate powder having a particle size within a range of 0.01~0.1 μm. The calcium oxide-based powder of the present disclosure is commercially available.

According to a specific embodiment of the present disclosure, the calcium oxide-based powder has an average particle size of 0.01~200 μm.

In the present disclosure, the average particle size refers to the average particle diameter.

The present disclosure defines a wide range of choices concerning the specific type of the alumina-based powder, it may be a variety of alumina-based powder conventionally used in the technical field. Unless otherwise specifically defined, the term "alumina-based powder" in the present disclosure refers to a substance which can be converted into alumina by the synthesis method of the present disclosure. Preferably, the alumina-based powder is at least one selected from the group consisting of alumina sol, alumina powder, aluminum hydroxide powder and calcium aluminate powder, and more preferably the alumina-based powder is alumina sol and/or alumina powder. The alumina-based powder of the present disclosure is commercially available.

According to a specific embodiment of the present disclosure, the alumina-based powder has an average particle size of 0.01 to 200 μm.

According to the present disclosure, the weight ratio between the calcium oxide-based powder and the alumina-based powder is within a range of 12:(2~15), preferably 12:(3~10), more preferably 12:(5~8).

According to the present disclosure, preferably, the mixing is grinding, and further preferably, the grinding uses at least one selected from the group consisting of a ball mill, a colloid mill, a Raymond pulverizer, an ultrafine pulverizer, a vertical pulverizer and a rod mill. In the embodiments of the present disclosure, a ball mill and a colloid mill are taken as examples for illustrative purposes, but the present disclosure is not limited thereto.

According to the present disclosure, preferably, the mixing comprises: grinding the calcium oxide-based powder and the alumina-based powder, and then adding the adhesion pore-enlarging agent to perform the pelleting and molding process.

According to the present disclosure, the adhesion pore-enlarging agent is preferably at least one selected from the group consisting of starch, modified starch, lignin adhesive, cellulose adhesive, coal tar, oil slurry, liquid asphalt, asphalt powder, polyethylene glycol, phenolic resin, urea-formaldehyde resin, polyvinyl formal resin, polyvinyl acetal resin, carbon powder, bone glue and polyvinyl acetate resin, further preferably at least one selected from the group consisting of modified starch, lignin adhesive and asphalt powder.

The present disclosure defines a wide range with respect to the added amount of the adhesion pore-enlarging agent, for example, the added amount of the adhesion pore-enlarging agent accounts for 0.1~15% by weight of a total amount of the calcium oxide-based powder and alumina-based powder. The added amount of the adhesion pore-enlarging agent is preferably 0.5~8% by weight, more preferably 1~2% by weight, based on a total amount of the calcium oxide-based powder and alumina-based powder.

According to the present disclosure, specifically, the adhesion pore-enlarging agent may be added by means of an adhesion pore-enlarging agent solution, and the present disclosure has a wide range of selection with respect to water in the adhesion pore-enlarging agent solution, preferably, the added amount of water is 5~25% by weight based on the total amount of the calcium oxide-based powder and the alumina-based powder; the added amount of water is further preferably 8~20% by weight, more preferably 10~15% by weight, based on the total amount of the calcium oxide-based powder and alumina-based powder.

According to a preferred embodiment of the disclosure, the pelleting and molding process is carried out by spray granulation or semi-dry blending granulation. The spray granulation or semi-dry blending granulation can be performed according to conventional technical mean in the art, the present disclosure does not impose a particular definition.

According to a specific embodiment of the present disclosure, the pelleted and molded product may have an average particle size of 10~1,000 μm. An example of 80~150 μm is illustrated in the example of the present disclosure, and the present disclosure is not limited thereto.

According to the present disclosure, the pelleted and molded product is subject to pyrolyzing and coking process in the rotary kiln reactor, an outlet reaction temperature of the rotary kiln reactor is 300° C.~500° C., a residence time is within a range of 0.2~3.5 h; preferably, the outlet reaction temperature of the rotary kiln reactor is 400° C.~500° C., the residence time is 1~3.5 h; and further preferably, the outlet reaction temperature of the rotary kiln reactor is 450° C.~500° C., and the residence time is 1.5~2.5 h.

According to the present disclosure, the product obtained from the pyrolyzing and coking process in the rotary kiln reactor is subject to a solidus reaction in an internal heating rotary kiln reactor under the conditions including an outlet reaction temperature of 900° C.~1,500° C. and a residence time of 0.1~5 h; preferably, the solidus reaction is carried out under the conditions including an outlet reaction temperature of 1,000° C.~1,300° C. and a residence time of 1~5 h; and more preferably, the solidus reaction is performed at an outlet reaction temperature of 1,100° C.~1,200° C. and a residence time of 2~4 h.

According to a preferred embodiment of the present disclosure, decomposing and gasifying the pyrolyzed char in the calcium aluminate to promote the formation of pores refers to promoting the formation of pores by high-temperature steam gasification, or promoting the formation of pores by air combustion.

According to the present disclosure, the specific operation of gasification with high temperature water steam may be carried out according to conventional technical means in the art. For example, the high-temperature steam gasification may be performed in a gasifier, preferably a fluidized bed gasifier, which is disposed at the outlet of the internal heating rotary kiln reactor. The pyrolyzed char in the calcium aluminate as the outlet product of the internal heating rotary kiln reactor is gasified with the water steam in the fluidized bed gasifier. Preferably, the conditions for promoting the formation of pores by high-temperature steam gasification include: the temperature is within a range of 800° C.~1,100° C., the time is 0.05~2 h, a mass ratio of used amount of the water steam relative to the pyrolyzed char is (1~3):1, further preferably (1~1.5):1. According to the present disclosure, during the process of promoting the formation of pores by high-temperature steam gasification, while it promotes the formation of pores by gasifying the pyrolyzed char in the calcium aluminate, the temperature of the calcium aluminate is lowered due to an endothermic reaction in the gasification process.

Accordance to the present disclosure, the specific operation of promoting the formation of pores by air combustion may be carried out in accordance with conventional technical means in the art. For example, the process of promoting the formation of pores by air combustion may be performed in a combustor, preferably in a moving bed combustor, the combustor is disposed at an outlet of the internal heating rotary kiln reactor. The pyrolyzed char in the calcium aluminate as the outlet product of the internal heating rotary kiln reactor is combusted with air in the moving bed combustor. Preferably, the conditions for promoting the formation of pores by air combustion include: the temperature is 750° C.~1,200° C., the time is 0.005~2 h, a mass ratio of the used amount of the air relative to the pyrolyzed char is (1~2):1, further preferably is (1~1.5):1. Preferably, the pyrolyzed char in the calcium aluminate as the outlet product of the internal heating rotary kiln reactor is combusted with segmented air in the moving bed combustor. According to the present disclosure, the process of promoting the formation of pores by air combustion may further promote generation of the calcium aluminate crystalline phase.

According to the stepwise solidus synthesis method for a micro-mesoporous calcium aluminate catalyst provided by the present disclosure, preferably, the method further comprises: classifying the produced micro-mesoporous calcium aluminate catalyst according to the particle size. The skilled person in the art may classify (e.g., by sieving) the produced micro-mesopured calcium aluminate catalyst according to different particle size requirements of the micro-mesadium calcium aluminate catalyst, thereby obtain the micro-mesopured calcium aluminate catalyst meeting the particle size requirement, such as a micro-mesopured calcium aluminate catalyst having a particle size between 20 and 150 μm. Preferably, the remaining portion of the calcium aluminate catalyst (which is excessively fine or coarse) may be returned to the mixing process for reuse as a feedstock. Specifically, the remaining portion of the calcium aluminate catalyst may be returned to the grinding process (in a ball mill) for reuse as a feedstock.

The micro-mesoporous calcium aluminate catalyst prepared with the method provided by the present disclosure has a larger specific surface area and pore volume and a smaller density. The ordinary calcium aluminate powder generally has a specific surface area not more than 1 $m^2/g$, a micro-mesoporous pore volume of 0.33 $cm^3/g$, and a density of about 4,000 $kg/m^3$. As a contrast, the micro-mesoporous calcium aluminate catalyst prepared with the method provided by the present disclosure has a specific surface area more than 120 $m^2/g$, a micro-mesoporous pore volume increased by more than 60%, and a density which may be reduced to below 920 $kg/m^3$.

The present disclosure will be described in detail with reference to the following examples.

In the following examples, the specific surface area and micro-mesoporous pore volume of the micro-mesoporous calcium aluminate catalyst are measured by mercury intrusion method. The abrasion resistance index of the micro-mesoporous calcium aluminate catalyst is measured by a straight tube method for determining an abrasion resistance index of the catalyst. The heat resistance temperature is measured by a catalyst activity assay method, and the measurement results are shown in Table 1.

Example 1

The nanometer calcium carbonate powder (with an particle size range of 1~80 nm, similarly hereinafter) and the alumina sol (with an alumina content of 15% by weight, similarly hereinafter) are uniformly ground and mixed by a ball mill according to a mixed ratio 12:7 by weight of the calcium oxide relative to the alumina, such that a calcium-aluminum mixed powder is obtained, feeding the calcium-aluminum mixed powder into a mixer, and then adding the mixture with an adhesion pore-enlarging agent solution formed by a mixture of modified starch and asphalt powder having a mass ratio of 2:1 and water, and subsequently performing a mixing, pelleting and molding process with a semi-dry method (to obtain microspheres having an average particle size of 180 μm), wherein the added amount of a mixture of the modified starch and the asphalt powder is 2% by weight of a total amount of the nanometer calcium carbonate powder (calculated based on calcium oxide) and the alumina sol (calculated based on alumina), the added amount of water is 15% by weight of a total amount of the nanometer calcium carbonate powder (calculated based on calcium oxide) and the alumina sol (calculated based on alumina), the pelleted and molded product is subject to pyrolyzing and coking process in a rotary kiln reactor under the conditions including an outlet reaction temperature of 500° C. and a residence time of 2.5 h, and then decomposing calcium carbonate into calcium oxide and subjecting the calcium oxide and alumina to a solidus reaction in an internal heating rotary kiln reactor under the conditions of an heated outlet reaction temperature of 1,200° C. and a residence time of 3.5 h, so as to form calcium aluminate microsphere powder, and then gasifying the pyrolyzed char in the calcium aluminate with water steam and promoting the formation of pores in a fluidized bed gasifier disposed at an outlet of the internal heating rotary kiln reactor, in the meanwhile, the temperature of the calcium aluminate microsphere powder is lowered due to an endothermic reaction in the gasification process, wherein the conditions for gasifying calcium aluminate with water steam include: the temperature is 1,000° C., the time is 1 hour, a mass ratio of used amount of water steam relative to the pyrolyzed char is 1.5:1. The obtained fluidized calcium aluminate catalyst is classified according to the required particle size range, so as to produce the micro-mesoporous calcium aluminate catalyst having a suitable particle size range (the particle size within a range of 20~150 μm); the remaining portion of the calcium aluminate catalyst which is excessively fine or coarse may be returned to the ball mill for reuse as a feedstock.

Example 2

The limestone powder (with an average particle size of 15 μm), the alumina powder (with an average particle size of 40 μm) and the excessively fine calcium aluminate powder (with an average particle size of 5 μm) are uniformly ground and mixed by a ball mill according to a mixed ratio 12:6 by weight of the calcium oxide relative to the alumina, such that a calcium-aluminum mixed powder is obtained, feeding the calcium-aluminum mixed powder into a mixer, and then adding the mixture with an adhesion pore-enlarging agent solution formed by a mixture of a lignin adhesive and water, and subsequently performing a mixing, pelleting and molding process with a semi-dry method to obtain microspheres having an average particle size of 200 μm, wherein the added amount of the lignin adhesive is 1% by weight of a total amount of the limestone powder (calculated based on calcium oxide) and the alumina powder (calculated based on alumina), the added amount of water is 10% by weight of a total amount of the limestone powder (calculated based on calcium oxide) and the alumina powder (calculated based on alumina), the pelleted and molded product is subject to pyrolyzing and coking process in a rotary kiln reactor under the conditions including an outlet reaction temperature of 500° C. and a residence time of 3.5 h, and then decomposing the limestone into calcium oxide and subjecting the calcium oxide and alumina to a solidus reaction in an internal heating rotary kiln reactor under the conditions of an heated outlet reaction temperature of 1,100° C. and a residence time of 2.5 h, so as to form calcium aluminate microspheres, and then combusting the pyrolyzed char in the calcium aluminate with segmented air and promoting the formation of pores in a moving bed combustor disposed at an exit of the rotary kiln, and further promoting generation of the calcium aluminate crystalline phase, wherein the conditions of combustion with segmental air include: the temperature is 1,000° C., the time is 0.5 h, and the mass ratio of the inlet air relative to the pyrolyzed char is 1.2:1. The obtained calcium aluminate catalyst is classified according to the required particle size range, so as to produce the micro-mesoporous calcium aluminate catalyst having a suitable particle size range (the particle size within a range of 20~150 μm); the remaining portion of the calcium aluminate catalyst which is excessively fine or coarse may be returned to the ball mill for reuse as a feedstock.

Example 3

The nanometer calcium carbonate powder and the alumina sol are taken according to a weight ratio 12:7 of calcium oxide relative to alumina, and adding it with a lignin adhesive in an amount of 1% by weight relative to a total weight of a nanometer calcium carbonate powder calculated based on calcium oxide and an alumina sol based on alumina, the mixture is ground and mixed uniformly by a colloid mill so as to form a calcium-aluminum mixed slurry, which is subject to spray pelleting and molding to obtain microspheres having an average particle size of 80 μm. the pelleted and molded product is subject to pyrolyzing and coking process in a rotary kiln reactor under the conditions including an outlet reaction temperature of 450° C. and a residence time of 1.5 h, and then decomposing calcium carbonate into calcium oxide and subjecting the calcium oxide and alumina to a solidus reaction in an internal heating rotary kiln reactor under the conditions of an heated outlet reaction temperature of 1,200° C. and a residence time of 3.5 h, so as to form calcium aluminate microspheres, and then gasifying the pyrolyzed char in the calcium aluminate with water steam and promoting the formation of pores in a fluidized bed gasifier disposed at an outlet of the internal heating rotary kiln reactor, in the meanwhile, the temperature of the calcium aluminate microsphere powder is lowered due to an endothermic reaction in the gasification process, wherein the conditions for gasifying calcium aluminate with water steam include: the temperature is 1,100° C., the time is 0.5 h, a mass ratio of used amount of water steam relative to the pyrolyzed char is 1.15:1. The obtained fluidized calcium aluminate catalyst is classified according to the required particle size range, so as to produce the micro-mesoporous calcium aluminate catalyst having a suitable particle size range (the particle size within a range of 20~150 μm); the remaining portion of the calcium aluminate catalyst which is excessively fine or coarse may be returned to the colloid mill for reuse as a feedstock.

Example 4

The example is performed according to the method of Example 1 except for that the pelleted and molded product is subject to pyrolyzing and coking process in the rotary kiln reactor under the conditions including an outlet reaction temperature of 400° C. and a residence time of 2.5 h, so as to produce the micro-mesoporous calcium aluminate catalyst.

Example 5

The example is performed according to the method of Example 1 except for that the product obtained from the pyrolyzing and coking process is subject to a solidus reaction in the internal heating rotary kiln reactor under the conditions including an outlet reaction temperature of 900° C. and a residence time of 3.5 h, thereby produce the micro-mesoporous calcium aluminate catalyst.

Example 6

The example is performed according to the method of Example 1 except for that the product obtained from the pyrolyzing and coking process is subject to a solidus reaction in an internal heating rotary kiln reactor under the conditions including an outlet reaction temperature of 1,300° C. and a residence time of 3.5 h, thereby produce the micro-mesoporous calcium aluminate catalyst.

Comparative Example 1

The nanometer calcium carbonate powder (average particle diameter of 20 nm) and the alumina sol (with an alumina content of 15% by weight) are ground and mixed uniformly by a ball mill according to a mixed ratio 12:7 by weight of the calcium oxide relative to the alumina to obtain a calcium-aluminum mixed powder; the calcium carbonate is then decomposed into calcium oxide in an internal heating rotary kiln reactor under the conditions of an heated outlet reaction temperature of 1,200° C. and a residence time of 3.5 h, subjecting the calcium oxide and alumina to a solidus reaction so as to form calcium aluminate microsphere powder. The cooled calcium aluminate microsphere powder catalyst is classified according to the required particle size range, thereby produce a micro-mesoporous calcium aluminate catalyst having a suitable particle size range (particle size of 20~150 μm).

TABLE 1

| Number of Examples | Specific Surface Area, $m^2/g$ | Density, $kg/m^3$ | Micro-mesop orous Pore Volume, $cm^3/g$ | Abrasion Resistance Index, %/h | Heat Resistance Temperature, ° C. |
|---|---|---|---|---|---|
| Example 1 | 120 | 900 | 0.50 | 1.0 | 1500 |
| Example 2 | 140 | 920 | 0.55 | 1.2 | 1500 |
| Example 3 | 200 | 850 | 0.61 | 1.2 | 1500 |
| Example 4 | 350 | 800 | 0.66 | 1.3 | 1500 |
| Example 5 | 100 | 920 | 0.49 | 0.8 | 1500 |
| Example 6 | 180 | 870 | 0.58 | 1.2 | 1500 |
| Comparative Example 1 | 2 | 3900 | 0.03 | 0.2 | 1500 |

It is illustrated from the results of Table 1 that the stepwise solidus synthesis method for a micro-mesoporous calcium aluminate catalyst provided by the present disclosure is used for preparing the calcium aluminate catalyst having a large specific surface area of micro-mesopores, low density and high strength with technical means such as mixing the calcium oxide-based powder and the alumina-based powder, and an adhesion pore-enlarging agent which is prone to form char, pelleting, coking with low temperature, performing the high-temperature solidus synthesis, decomposing and gasifying the pyrolyzed char to promote the formation of pores. In a preferable condition, the catalyst has an abrasion resistance index less than 1.3% and a heat resistance temperature up to 1,500° C.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A stepwise solidus synthesis method for a micro-mesoporous calcium aluminate catalyst, comprising:
   mixing a calcium oxide-based powder with an alumina-based powder and an adhesion pore-enlarging agent;
   pelleting and molding the mixture; pyrolyzing and coking the pelleted and molded product in a rotary kiln reactor under the conditions including an outlet reaction temperature of 300° C.-500° C. and a residence time of 0.2-3.5 h;
   subsequently carrying out a solidus reaction in an internal heating rotary kiln reactor under the conditions including an outlet reaction temperature of 900° C.-1,500° C. and a residence time of 0.1-5 h to produce calcium aluminate;

decomposing and gasifying the pyrolyzed char in the calcium aluminate to promote the formation of pores, thereby producing micro-mesoporous calcium aluminate catalyst;

wherein the weight ratio between the calcium oxide-based powder and the alumina-based powder is within a range of 12:(2-15), the added amount of the adhesion pore-enlarging agent accounts for 0.1-15% by weight of a total amount of the calcium oxide-based powder and alumina-based powder, the weight of the calcium oxide-based powder is calculated based on calcium oxide, and the weight of the alumina-based powder is calculated based on alumina, and decomposing and gasifying the pyrolyzed char in the calcium aluminate to promote the formation of pores is achieved by the formation of pores by high-temperature steam gasification or by air combustion.

2. The stepwise solidus synthesis method for a micro-mesoporous calcium aluminate catalyst according to claim 1, wherein the weight ratio between the calcium oxide-based powder and the alumina-based powder is within a range of 12:(3-10).

3. The stepwise solidus synthesis method for a micro-mesoporous calcium aluminate catalyst according to claim 1, wherein the calcium oxide-based powder is at least one selected from the group consisting of nanometer calcium carbonate powder, calcium hydroxide powder, calcium oxide powder, calcium acetate powder, calcium nitrate powder and limestone powder.

4. The stepwise solidus synthesis method for a micro-mesoporous calcium aluminate catalyst according to claim 1, wherein the alumina-based powder is at least one selected from the group consisting of alumina sol, alumina powder, aluminum hydroxide powder and calcium aluminate powder.

5. The stepwise solidus synthesis method for a micro-mesoporous calcium aluminate catalyst according to claim 1, wherein the mixing is grinding.

6. The stepwise solidus synthesis method for a micro-mesoporous calcium aluminate catalyst according to claim 5, wherein the grinding uses at least one selected from the group consisting of a ball mill, a colloid mill, a Raymond pulverizer, an ultrafine pulverizer, a vertical pulverizer and a rod mill.

7. The stepwise solidus synthesis method for a micro-mesoporous calcium aluminate catalyst according to claim 1, wherein the mixing comprises: grinding the calcium oxide-based powder and the alumina-based powder, and then adding the adhesion pore-enlarging agent to perform the pelleting and molding process.

8. The stepwise solidus synthesis method for a micro-mesoporous calcium aluminate catalyst according to claim 1, wherein the adhesion pore-enlarging agent is at least one selected from the group consisting of starch, modified starch, lignin adhesive, cellulose adhesive, coal tar, oil slurry, liquid asphalt, asphalt powder, polyethylene glycol, phenolic resin, urea-formaldehyde resin, polyvinyl formal resin, polyvinyl acetal resin, carbon powder, bone glue and polyvinyl acetate resin.

9. The stepwise solidus synthesis method for a micro-mesoporous calcium aluminate catalyst according to claim 1, wherein the added amount of the adhesion pore-enlarging agent accounts for 0.5-8% by weight of a total amount of the calcium oxide-based powder and alumina-based powder.

10. The stepwise solidus synthesis method for a micro-mesoporous calcium aluminate catalyst according to claim 1, wherein the pelleting and molding process is carried out by spray granulation or semi-dry blending granulation.

11. The stepwise solidus synthesis method for a micro-mesoporous calcium aluminate catalyst according to claim 1, wherein the pelleted and molded product is subject to pyrolyzing and coking process in the rotary kiln reactor under the conditions including an outlet reaction temperature of 400° C.-500° C. and a residence time of 1-3.5 h.

12. The stepwise solidus synthesis method for a micro-mesoporous calcium aluminate catalyst according to claim 1, wherein the solidus reaction is performed in the internal heating rotary kiln reactor under the conditions including an outlet reaction temperature of 1,000° C.-1,300° C. and a residence time of 1-5 h to produce the calcium aluminate.

13. The stepwise solidus synthesis method for a micro-mesoporous calcium aluminate catalyst according to claim 1, wherein the conditions for promoting the formation of pores by high-temperature steam gasification include: the temperature is within a range of 800° C.-1,100° C., the time is 0.05-2 h, a mass ratio of used amount of the water steam relative to the pyrolyzed char is (1-3):1.

14. The stepwise solidus synthesis method for a micro-mesoporous calcium aluminate catalyst according to claim 1, wherein the conditions for promoting the formation of pores by air combustion include: the temperature is 750° C.-1,200° C., the time is 0.005~2 h, a mass ratio of the used amount of the air relative to the pyrolyzed char is (1-2):1.

15. The stepwise solidus synthesis method for a micro-mesoporous calcium aluminate catalyst according to claim 1, wherein the method further comprises: sieving the produced micro-mesoporous calcium aluminate catalyst according to the particle size to obtain a micro-mesopured calcium aluminate catalyst having a particle size between 20 and 150 μm.

* * * * *